United States Patent [19]

Preston

[11] Patent Number: 5,253,944
[45] Date of Patent: Oct. 19, 1993

[54] PRECISION ALIGNMENT AND MOUNTING APPARATUS

[75] Inventor: Dennis R. Preston, Brookfield, Conn.
[73] Assignee: Hughes Aircraft Company, Los Angeles, Calif.
[21] Appl. No.: 748,587
[22] Filed: Aug. 22, 1991
[51] Int. Cl.⁵ ............................................. F16B 21/00
[52] U.S. Cl. ....................................... 403/13; 403/24; 403/337; 403/408.1; 244/158 R; 244/161; 244/54; 411/386; 411/107; 411/353; 411/999
[58] Field of Search ................ 403/13, 14, 24, 408.1, 403/337; 244/158 R, 161, 54; 411/386, 353, 352, 107, 108, 113, 970, 999; 439/374, 66, 73–74, 330, 350

[56] References Cited

U.S. PATENT DOCUMENTS

| | | | |
|---|---|---|---|
| 3,343,581 | 9/1967 | Martin et al. | 411/999 X |
| 3,608,848 | 9/1971 | Cantor et al. | 244/161 |
| 4,508,296 | 4/1985 | Clark | 403/76 X |
| 4,607,815 | 8/1986 | Turci et al. | 244/161 |
| 5,040,748 | 8/1991 | Torre et al. | 244/161 |

FOREIGN PATENT DOCUMENTS 2182295  5/1987  United Kingdom ............ 244/158 R

Primary Examiner—Randolph A. Reese
Assistant Examiner—Harry C. Kim
Attorney, Agent, or Firm—Michael W. Sales; Wanda K. Denson-Low

[57] ABSTRACT

An alignment and mounting apparatus for mounting two modules (10,12) includes a first portion having a cylindrical alignment pin (16) projecting normal to a module surface, a second portion having a three-stage alignment guide (18) including a shoehorn flange (34), a Y-slot (42) and a V-block (22) which sequentially guide the alignment pin (16) with successively finer precision and a third portion in the form of a spring-loaded captive fastener (20) for connecting the two modules after alignment is achieved.

11 Claims, 2 Drawing Sheets

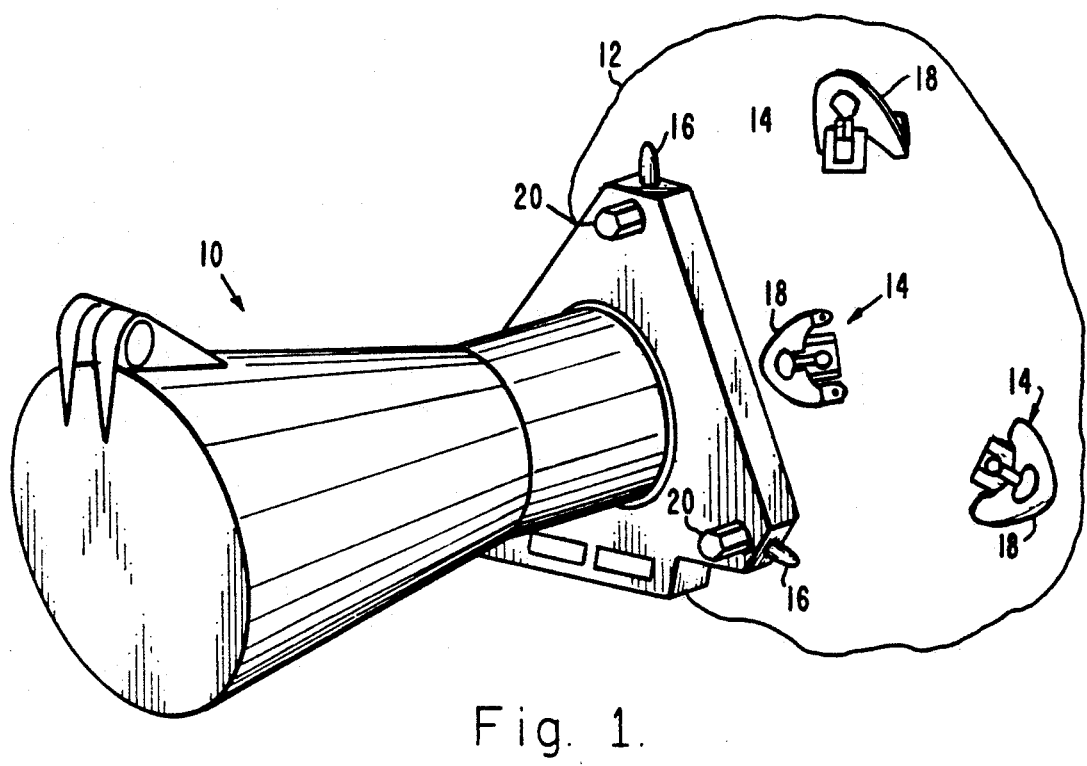
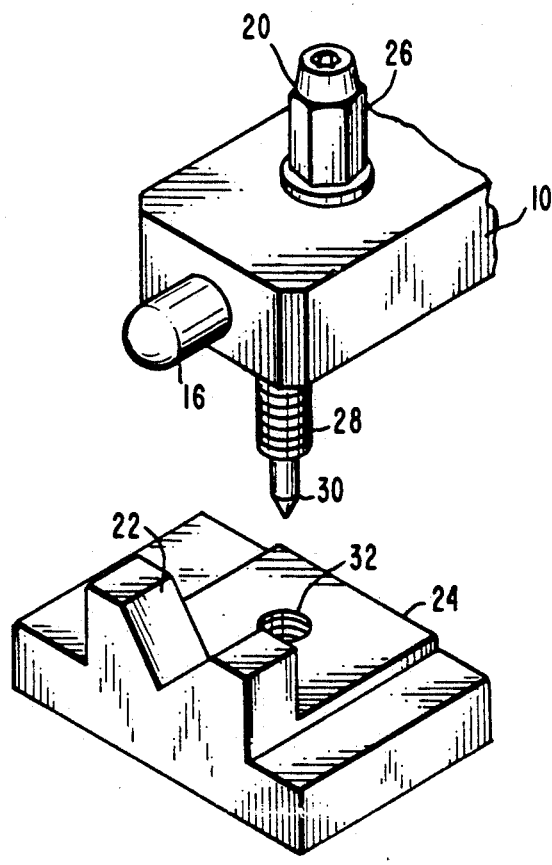
Fig. 1.
Fig. 2.

5,253,944

PRECISION ALIGNMENT AND MOUNTING APPARATUS

The invention described herein was made in the performance of work under NASA Contract Number NAS9-18200 and is subject to the provisions of Section 305 of the National Aeronautics and Space Act of 1958 (72 Stat. 435; 42 U.S.C. 2457).

BACKGROUND OF THE INVENTION

1. Field of the Invention

The present invention relates to a precision alignment and mounting apparatus and more particularly to a device for rapid alignment which includes three stages of increasingly finer guides for aligning two modules for connection.

2. Description of the Prior Art

There are many instances where components or modules must be aligned and mounted together in a precise manner. In many such instances the alignment and mounting need not be rapidly accomplished and can be performed in a controlled environment. However, there are other situations where rapid alignment and mounting is an absolute necessity and where the environment is adverse.

An example of such a situation that requires rapid precision alignment and mounting may be found in space equipment where components mounted to the equipment must be periodically replaced. Such components are known as orbit replaceable units (ORUs), all ORUs require rapid, low effort alignment procedures that are compatible with the capabilities of a suited astronaut or a telerobot.

Heretofore such alignment systems simply used edge guide techniques which did not provide precise control of the position in all three axes. Such prior art devices utilized alignment guides that were single stage and did not provide a high degree of precision. Examples of alignment guides are found in *Design For On-orbit Spacecraft Servicing*, DFOSS Handbook, February, 1990, (draft version) and *Satellite Services Handbook Interface Guidelines* LMSC/NASA, Feb. 23, 1983.

SUMMARY OF THE INVENTION

The present invention contemplates a precision alignment and mounting apparatus which provides for controlled alignment of modules in sequential steps of increasingly finer precision. The apparatus allows two modules to be mounted with little visual aid or tactile feedback to the person or apparatus performing the alignment. The apparatus is a compact, weight efficient device consisting of two mating halves, one half essentially being a cylindrical pin projecting normal to a module body and the other half comprising a three-stage alignment system including a shoehorn flange, a Y-slot and a V-block which in turn guide and align the pin with successively finer precision. A spring-loaded captive fastener is associated with one module and is adapted to be screwed into a threaded opening in the other module after alignment has been achieved.

A primary objective of the present invention is to provide a precision alignment apparatus.

Another objective of the present invention is to provide an alignment apparatus having sequentially finer alignment guides.

Another objective of the present invention is to provide an alignment apparatus that requires little visual aid or tactile feedback.

Another objective of the present invention is to provide an alignment apparatus that is both compact and lightweight.

DESCRIPTION OF THE DRAWINGS

FIG. 1 is an isometric view illustrating how two modules may be aligned utilizing the apparatus of the present invention.

FIG. 2 is an isometric view illustrating in greater detail the finest alignment guide and the mounting means of the present invention.

DETAILED DESCRIPTION OF THE PRESENT INVENTION

Figure 3:
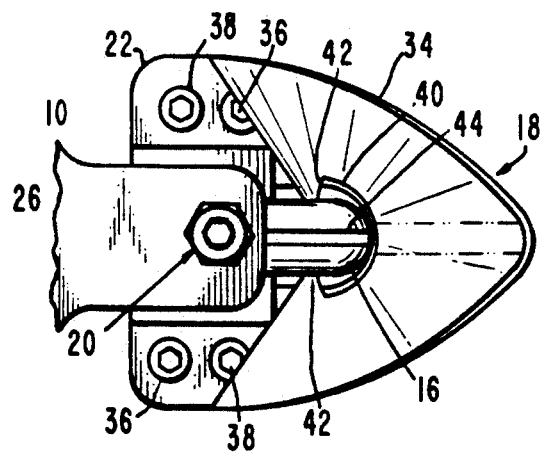
FIG. 3 is a top view showing the components of the alignment apparatus of the present invention in their mounted position.

FIG. 1 shows how the present invention may be utilized to attach two modules or, in particular, how a star tracker module 10 in the form of an ORU may be mounted to a space station 12. The ORU 10 is mounted to the station 12 using three alignment and mounting apparatus 14 constructed in accordance with the present invention. Each apparatus 14 comprises a first portion in the form of a cylindrical pin 16, a second portion in the form of a three-stage alignment guide 18 and a third portion in the form of an attachment means 20.

Referring to FIG. 2, there is shown in greater detail the two halves of the present invention. The pin 16 is cylindrical with a spherical end and may have a diameter of one half inch as an example. The pin is mounted normal to a surface of the ORU 10. The three-stage alignment guide 18 includes as a final stage a V-groove 22, which is precision formed in a mounting block 24, which is precisely located on the station 12. The V-groove 22 is adapted to receive pin 16 and to precisely align the pin within the groove.

The attachment means 20 may be in the form of a spring-loaded captive fastener mounted in the ORU 10 adjacent to the pin 16. The spring-loaded captive fastener may be selected from many commercially available devices. A satisfactory device may be obtained from Rexnord of Torrance, Calif. The spring-loaded captive fastener may include a hexhead 26 with a threaded shaft 28 and an integral guidepoint 30. The fastener is spring loaded so that it is retracted within the ORU 10 so that the guidepoint 30 does not protrude beyond a surface of the ORU. Such protrusion could interfere with the alignment process. After the pin 16 is aligned in the groove 22 of the alignment apparatus, the spring-loaded captive fastener is activated so that the guidepoint 30 first extends into a threaded opening 32 to guide the threaded shaft 28 so that it may be screwed into the block 24.

Figure 4:
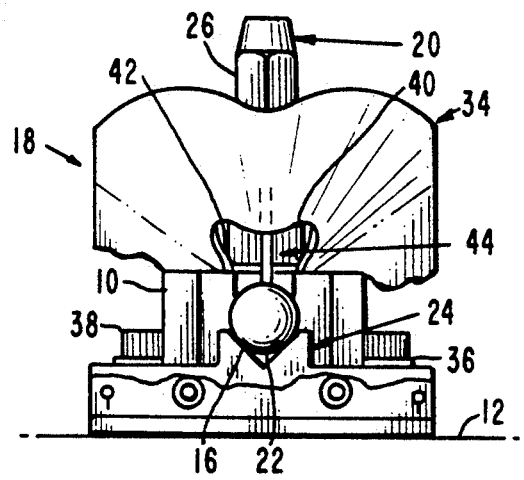
FIG. 4 is a right side view of the alignment apparatus of FIG. 3.
Figure 5:
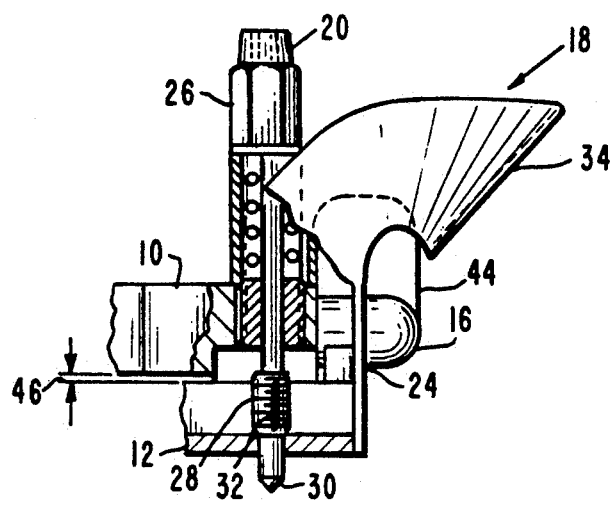
FIG. 5 is a partial vertical section of a front view of the alignment apparatus of FIG. 3.

Referring to FIGS. 3, 4 and 5, there is shown in greater detail the three-stage alignment guide 18 of the present invention which comprises a shoehorn flange 34, which is aligned to block 24 using alignment pins 36 and mounting bolts 38. The shoehorn flange 34 functions as a first-stage-course alignment guide for engaging pin 16 and essentially funneling the pin to an exit opening 40 of the shoehorn flange. The opening 40 leads into a Y-slot 42 which functions as a second-alignment stage for guiding the pin 16 into the V-groove 22.

Thus, in the first stage the shoehorn flange 34 provides a broad capture range for the alignment pin 16 as the pin enters the funnel-shaped shoehorn 34. As the alignment pin 16 is funneled into the shoehorn, the pin enters the Y-slot 42, thereby reducing the allowable lateral motion and further directs the pin to the final alignment stage, namely, the V-groove 22 in which the pin is finally seated. When the pin is seated into the V-groove, all clearance is eliminated and the pin is fastened to the block 24 by the spring-loaded captive fastener 20, which has its threaded shaft 28 threadedly engaged in the opening 32. Referring to FIG. 5 there is shown a clearance 46 between the ORU surface and the mounting block to ensure that the pin 16 seats firmly in the V-groove 22.

In order to prevent any shifting of ORU 10, when one pin 16 may be aligned in groove 22 while the other pins are still being aligned, each pin 16 is provided with an upstanding fin 44, which prevents the pin 16 from slipping under the opening 40 of the shoehorn flange 34. The fin 44 is also useful during a removal operation to be certain that the pin freely slides out of the opening of the shoehorn flange when the ORU is being removed.

The shoehorn flange 34 may be simply formed from a sheet metal component and is thus quite inexpensive and easy to manufacture. The spring-loaded captive fastener is a commercial product that is readily available. The mounting block 24 with its V-groove 22 and the pin 16 must be precisely machined using standard manufacturing techniques.

Thus, the present invention provides a precision alignment and mounting apparatus that is rugged, lightweight and extremely easy to use. The apparatus allows for precision alignment and mounting with little visual aid or tactile feedback and thus may be accomplished by a suited astronaut or telerobot.

The invention has been described with a fastener associated with each alignment guide which is preferred for secure mounting; however, it is possible to practice the invention with a lesser number of fasteners which need not be associated with the alignment guides. Depending on the configuration of the ORU, a single fastener could be centrally located to securely hold the modules together. The fastener has been described as a threaded fastener; however, other types of fasteners could be used, such as pinch-type spring clips, magnets, or even gravity itself for earth-based applications The present invention, while being particularly useful for the mounting of ORUs to space equipment, is equally adaptable for fulfilling down-to-earth alignment and mounting needs where rapid precision alignment is required.

What is claimed is:

1. An alignment and mounting apparatus for aligning and mounting together first and second modules in a desired alignment position, comprising:
    an alignment pin mounted to said first module;
    a three-stage alignment means mounted to said second module for guiding and aligning said alignment pin to the desired alignment position, said three-stage alignment means having three alignment elements each providing finer alignment precision including a shoehorn flange providing a broad capture range for the alignment pin, said shoehorn flange having a funnel shape for funneling the pin towards an exit opening, a Y-slot formed at the opening of the shoehorn flange for reducing allowable alignment pin motion and a block having a V-groove juxtaposed with the Y-slot for providing a seated alignment for the alignment pin; and
    fastening means for mounting said first and second modules together.

2. An alignment and mounting apparatus as described in claim 1, wherein the fastening means comprises:
    a spring-loaded captive fastener mounted to said first module; and
    means associated with said second module for engaging with said spring-loaded captive fastener.

3. An alignment and mounting apparatus as described in claim 2, wherein the spring-loaded captive fastener comprises a threaded shaft having a guidepin formed at an end thereof; and
    said engaging means comprises a threaded opening for receiving the guidepin and threaded shaft.

4. An alignment and mounting apparatus as described in claim 1, wherein the alignment pin comprises:
    a cylindrical member; and
    a fin radially extending from said pin along a portion of the length thereof.

5. An alignment and mounting apparatus as described in claim 4, wherein the alignment pin terminate with a spherical end and the fin extends to the most distal portion of said pin.

6. An alignment and mounting apparatus for aligning and mounting together first and second modules in a desired orientation, comprising:
    at least three alignment pins mounted in a triangle orientation on said first module;
    at least three-stage alignment means mounted to said second module in corresponding relation to the alignment pins mounted to said first module for guiding and aligning said alignment pins to the desired orientation, said three-stage alignment means having three alignment elements each providing finer alignment precision including a shoehorn flange providing a broad capture range for the alignment pin, said shoehorn flange having a funnel shape for funneling the pin towards an exit opening, a Y-slot formed at the opening of the shoehorn flange for reducing allowable alignment pin motion and a block having a V-groove juxtaposed with the Y-slot for providing a seated alignment for the alignment pin; and
    fastening means for mounting said first and second modules together.

7. An alignment and mounting apparatus as described in claim 6, wherein the fastening means comprises:
    a spring-loaded captive fastener mounted to said first module; and
    means associated with said second module for engaging with said spring-loaded captive fastener.

8. An alignment and mounting apparatus as described in claim 7, wherein the spring-loaded captive fastener comprises a threaded shaft having a guidepin formed at an end thereof; and
    said engaging means comprises a threaded opening for receiving the guidepin and threaded shaft.

9. An alignment and mounting apparatus as described in claim 6, having a fastening means associated with each alignment pin.

10. An alignment and mounting apparatus as described in claim 6, wherein each alignment pin comprises:

a cylindrical member; and a fin radially extending from said pin along a portion of the length thereof.

11. An alignment and mounting apparatus as described in claim 10, wherein each alignment pin terminates with a spherical end and the fin extends to the most distal portion of said pin.

* * * * *